(12) United States Patent
Specht et al.

(10) Patent No.: US 6,787,747 B2
(45) Date of Patent: Sep. 7, 2004

(54) FAST PHASE DIVERSITY WAVEFRONT CORRECTION USING A NEURAL NETWORK

(75) Inventors: Donald Francis Specht, Los Altos, CA (US); Richard Lee Kendrick, Foster City, CA (US); Vassilis George Zarifis, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 10/252,528

(22) Filed: Sep. 24, 2002

(65) Prior Publication Data
US 2004/0056174 A1 Mar. 25, 2004

(51) Int. Cl.[7] .................................................. G02B 7/04
(52) U.S. Cl. .................................. 250/201.3; 250/201.9
(58) Field of Search .......................... 250/201.3, 201.2, 250/201.9, 216; 382/155, 156, 157, 159, 103

(56) References Cited

U.S. PATENT DOCUMENTS 6,075,884 A * 6/2000 Lubin et al. ................ 382/156

* cited by examiner

Primary Examiner—Que T. Le
(74) Attorney, Agent, or Firm—McDermott Will & Emery LLP

(57) ABSTRACT

A phase diversity wavefront correction system for use in a multiple aperture optical imaging system forms an in-focus image as a composite, focused image from the multiple apertures of the system and also forms an additional image which is deliberately made out of focus to a known extent. Taken together, the two images are processed to create one or more metrics, such as the power metric and sharpness metric. Neural networks are provided, each having an output corresponding to a parameter of an aperture of the imaging system, such as a piston position (axial displacement) or tip/tilt (angular displacement) of one telescope with respect to the others in the system. The neural networks each correspond to one parameter of a telescope or a combinations of parameters and are trained to identify a subset of elements within the metrics that, when input into the network, produce the best estimate of the piston or tip/tilt position relative to a reference telescope or an estimate of a combination of parameters, such as the average of a subset of telescopes. During active use of the system, metrics generated from the in-focus and out-of-focus images of the object scene and the trained neural networks are used to provide estimates of piston and/or tip/tilt positions which are in turn used to drive the pistons and/or tip/tilt controllers to correct for aberrant movement and keep the telescopes phased.

42 Claims, 4 Drawing Sheets

FAST PHASE DIVERSITY WAVEFRONT CORRECTION USING A NEURAL NETWORK

FIELD OF THE INVENTION

The present invention relates generally to optical imaging systems, and more particularly to a system and method for measuring wavefront errors and correcting the optics within multi-aperture adaptive optical systems based on a neural network.

BACKGROUND OF THE INVENTION

Imaging systems, particularly those that are very precise, have a continuous need to be aligned. This is particularly true for multi-aperture imaging systems such as those which implement an array of phased telescopes for image collection. Alignment generally is used to reduce or eliminate optical wavefront errors that are introduced as telescope parameters drift from optimal positions due to, for example, temperature drift, vibration, component shift or deformation. Adaptive optics are capable of removing wavefront errors, but only if an accurate measurement of the wavefront is available. Therefore, a wavefront sensor must be incorporated into the imaging system.

Wavefront sensors, such as Hartmann wavefront sensors, make measurements from point sources such as a star or a laser beacon. Hartmann wavefront sensors require the use of locally generated reference beams in order to measure quantities such as image intensity or wavefront phase. However, the use of additional reference beams is undesirable as they add to the overall complexity of the wavefront sensor and can introduce additional sources of scattered light which can have an adverse affect on the measurements of interest.

Wavefront sensors which use the object scene to provide information on the optical aberrations of an imaging system are more desirable than those which use reference beams for some applications. Other techniques include the use of phase retrieval and shearing interferometry. The latter technique is optically complex and requires reimaging optics for measurement of the wavefront at a pupil. The former technique requires some knowledge of the object scene such as the location of isolated point sources within the imaged field of view.

Phase diversity is an extension of the phase retrieval concept whereby two images, one containing an additional known aberration, are compared to determine the optical-system aberrations. Phase diversity algorithms that are independent of the object-scene content can be defined, making them useful for a broad range of adaptive optics applications.

There is a need for a multi-aperture imaging system that uses the object scene from the imaging system to determine and correct wavefront errors, independent of the objects of the scene. There is a further need for a system and method for reducing the complexity of collecting and analyzing the images from a multi-aperture imaging system so that corrections to parameters of the imaging system can be identified and made many times per second.

A prior art phase diversity system (as described in "Joint estimation of object and aberrations by using phase diversity," by R. Paxman, T. Schulz and J. Fienup, J. Opt. Soc. Am. A, Vol. 9, No. 7, pp. 1072–1085 (July 1992)) assesses parameter errors by comparing in-focus and out-of-focus images using a model of the optical system. Their approach requires iterations of the system model to match each frame of data. The present invention allows us to perform the iterative matching off-line during the neural network training so that on-line estimates can be made at a high frame rate without iteration.

SUMMARY OF THE INVENTION

The present invention is directed to a phase diversity wavefront correction system for use in multi-aperture optical imaging systems. A phase diversity sensor within the imaging system forms an in-focus image as a composite, focused image from the multiple apertures of the system and also forms an additional image which is deliberately made out of focus to a known extent. Taken together, the two images are processed to create one or more metrics, such as the power metric and sharpness metric. These metrics may be created, for example, according to the well known method of Gonsalves, which is described in "Phase Retrieval and Diversity in Adaptive Optics," R. A. Gonsalves, Opt. Eng. 21, 829–832 (1982).

Neural networks are provided, each having an output corresponding to a parameter of an aperture of the imaging system. The aperture may be a telescope in a system of telescopes acting as one, and the parameter may be a piston position (axial displacement) or tip/tilt (angular displacement) of one telescope with respect to the others in the system. Image quality depends critically on correct values of piston and tilt. The neural networks each correspond to one parameter of a telescope or a combinations of parameters. They are trained to identify a subset of elements within the metrics that, when input into the network, produce the best estimate of the piston or tip/tilt position relative to a reference telescope or an estimate of a combination of parameters, such as the average of a subset of telescopes. Then, during active use of the system, metrics generated from the in-focus and out-of-focus images of the object scene and the trained neural networks are used to provide estimates of piston and/or tip/tilt positions which are in turn used to drive the pistons and/or tip/tilt controllers to correct for aberrant movement and keep the telescopes phased. If desired, a measure of the reliability of the estimates may be used to determine whether the estimate should be used.

BRIEF DESCRIPTION OF THE DRAWINGS

The above described features and advantages of the present invention will be more fully appreciated with reference to the accompanying drawings and detailed description.

DETAILED DESCRIPTION

The present invention is directed to a phase diversity wavefront correction system for use in multi-aperture optical imaging systems. A phase diversity sensor within the imaging system forms an in-focus image as a composite, focused image from the multiple apertures of the system and also forms an additional image which is deliberately made out of focus to a known extent. Taken together, the two images are processed to create one or more metrics, such as the power metric and sharpness metric. These metrics may be created, for example, according to the method of Gonsalves.

Neural networks are provided, each having an output corresponding to a parameter of an aperture of the imaging system, or to an average or difference of parameters. The aperture may be a telescope or a mirror, and the parameter may be a piston position (axial position) or angular displacement of a telescope used to control the optics of the system. Each neural network is designed to estimate a single parameter, or an average or difference of parameters, of the system; each is trained with a subset of elements within the metrics which produce the best estimate of the parameter relative to a reference telescope. Then, during active use of the telescope, metrics generated from the in-focus and out-of-focus images of the object scene and the trained neural networks are used to provide an estimate of parameters which are in turn used to drive actuators to correct for system distortions. If desired, a measure of the reliability of the estimates may be used to determine whether the estimate should be used. The alternative is to take an additional sample.

Figure 1:
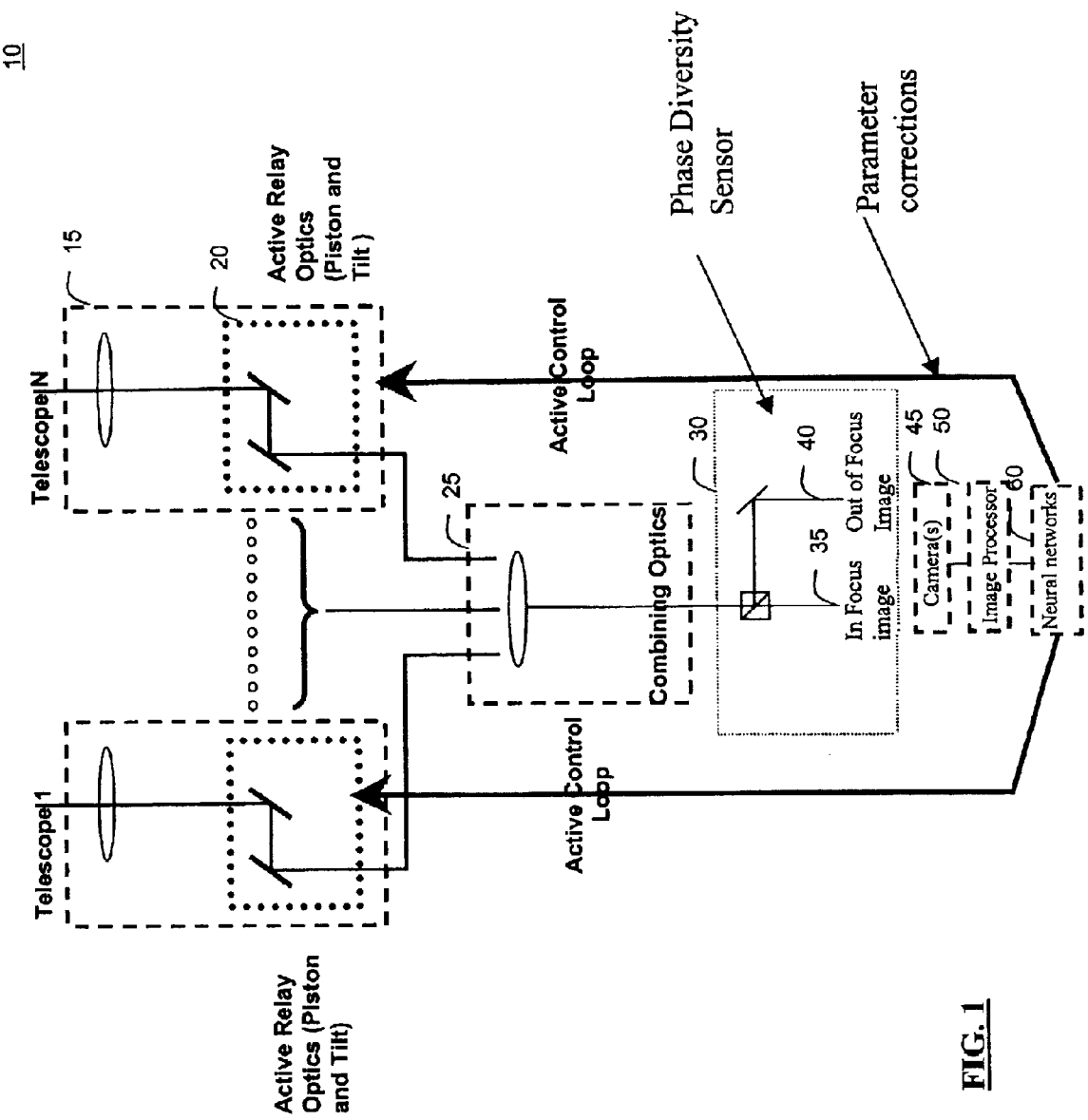
FIG. 1 depicts an optical imaging system implementing a neural network and phase diversity techniques for image correction according to an embodiment of the present invention.

FIG. 1 depicts a view of an optical imaging system 10 according to the present invention. Referring to FIG. 1, the optical imaging system 10 includes an array of telescopes 15. The array may be arranged in any convenient pattern, with a fill factor ranging from sparse to nearly 100 percent. The array of telescopes produces a plurality of images which are directed to active relay optics 20. The active relay optics contain controls for adjusting piston, tip, and tilt of each telescope. The combining optics 25 superimposes all of the images from the active relay optics to form one higher-resolution image which will be determined by the optics of the individual telescopes and by the relative positioning of the telescopes (phasing). This image would be captured by a science camera 45. Ultimately, the science camera image is generally deconvolved to yield a final image.

The output of the combining optics 25 feeds into a phase diversity sensor 30 where it is split into the in-focus-image 35 and delayed through a fixed optical path to form the out-of-focus image 40. Both of these images are captured by the phase diversity cameras 45 and input to the image processor 50. The image processor computes the power and sharpness metrics based on the in-focus and out-of-focus images. This may be done, for example, according to the methods described in the paper, "Phase-diversity wave-front sensor for imaging systems," by Richard L. Kendrick, D. S. Acton, and A. L. Duncan, Applied Optics, Vol. 33, No. 27, Sep. 20, 1994. The key property of the metrics is that they can be derived from an extended scene rather than a point source. The scene information is "divided out" so that the metrics reflect the characteristics of the telescope system independent of the scene information.

Conceptually, a single science camera 45 may capture the composite image to be deconvolved which can also be used for phase diversity. Alternatively, two separate cameras 45 may be used with different properties suited to the two different uses. An additional camera 45 may be-used to capture the out-of-focus image. Another alternative is to use one phase diversity camera 45 to collect both the in-focus and out-of-focus images side by side plus a science camera 45 for the high-resolution output.

The image processor 50 not only computes the scene independent metrics, but also extracts features from these metrics to become inputs to the neural networks 60. The neural networks estimate parameters which control actuators to correct the sensed piston and tip/tilt distortions.

Figure 2:
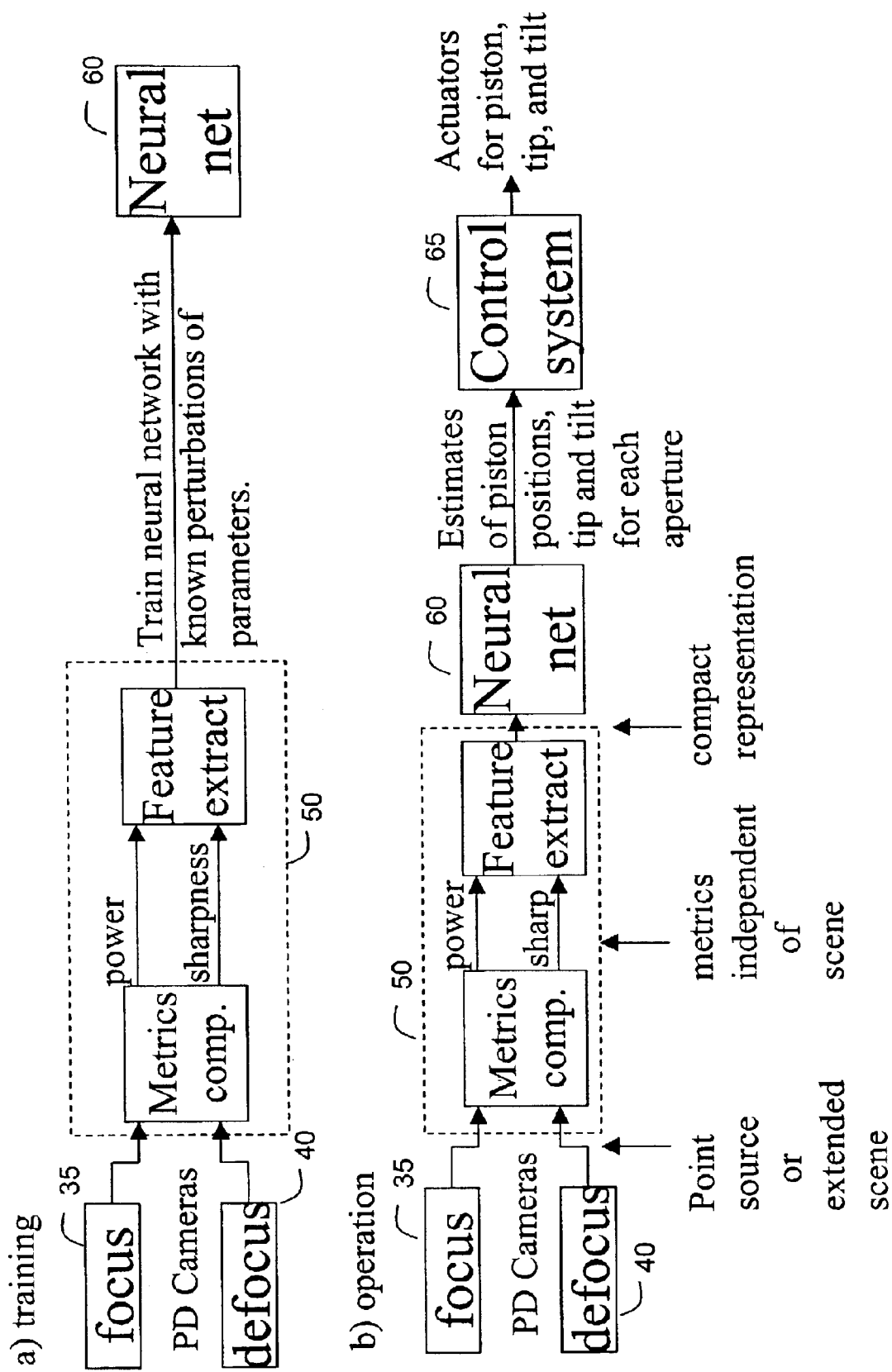
FIG. 2 describes in more detail the functions of the image processor and the neural network controllers according to an embodiment of the present invention.

FIGS. 2*a* and 2*b* show in more detail functions of the image processor and the neural network controllers. FIG. 2*a* shows the configuration for training the neural networks according to an embodiment of the invention. FIG. 2*b* shows use of the trained neural network for closed loop control of the pistons and tip and tilt for each of the telescopes.

In both FIG. 2*a* and FIG. 2*b* the image processor 50 computes the power and sharpness metrics independent of scene and then extracts features from these metrics which are used as inputs to the neural networks 60. In training the features are selected such that the neural network can estimate corrections necessary to the system parameters in such a way that the estimators will generalize to conditions not explicitly in the training set. In operation the features and the coefficients within the neural networks are fixed and the estimates from the neural networks are fed to the control system 65 that controls actuators for piston, tip, and tilt. The control system 65 is a set of components within the active relay optics 20. The actuators may be piezoelectric elements, motors, or any other convenient actuators. Tip and tilt may be effected by a gimbal system, by three linear actuators controlling the orientation of each mirror (a triangle mount), or any other convenient means. For the triangle mount configuration, when all three linear actuators move the same amount, this controls the axial position referred to as "piston". When they move different amounts, x tilt and y tilt are-superimposed on the pure piston motion. The nature of the actuators for controlling piston, x tilt, and y tilt are not the subject of this invention. The subject of this invention is the means by which it can be determined from an observed scene (which may be either a point source or an extended scene) the amount of correction to be applied to each of the actuators to bring the collection of mirrors or telescopes into focus and maintain it in focus in the face of changing conditions.

The following description refers only to estimating and correcting piston positions. It is to be understood that exactly the same procedure and considerations apply to estimating and correcting x tilt and y tilt perturbations.

Figure 3:
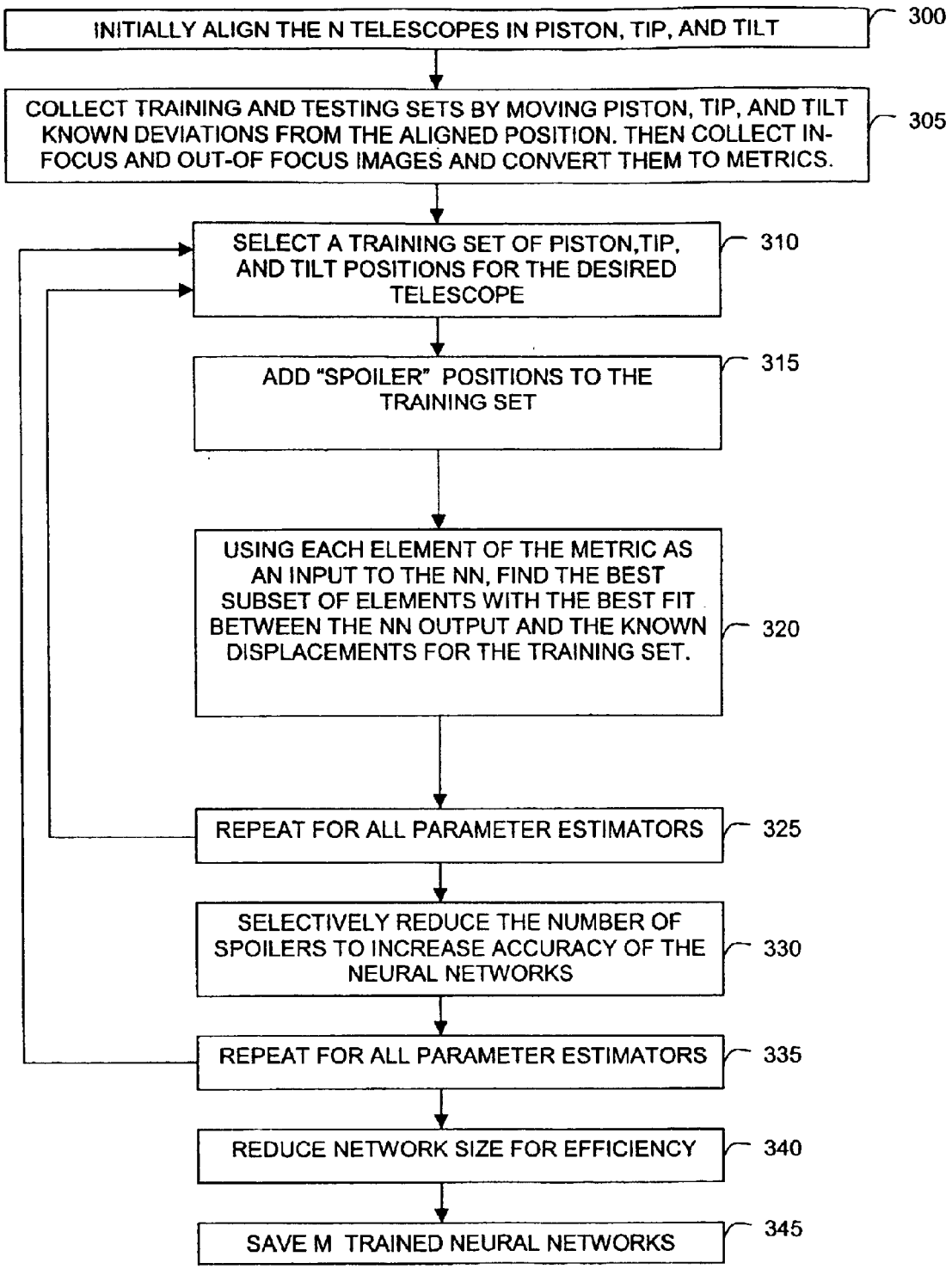
FIG. 3 depicts a method of training a neural network according to an embodiment of the present invention.

FIG. 3 depicts a method of configuring and training the neural networks 60 according to the present invention. Referring to FIG. 3, in step 300 the optical imaging system 10 is set to a predetermined alignment. In the context of a multi-aperture telescope system, this is represented by, for example, the pistons being driven to a known position relative to a reference piston and tip/tilt of each telescope adjusted such that all N images are superimposed by the combiner optics. This calibration procedure is typically performed with images enabled on only one telescope at a time plus the reference telescope. Each piston is coupled to an optical device, such as a mirror within the telescope as shown in FIG. 1, and thus its position has a direct impact on the wavefront error of the optical system.

In step 305, a training set is collected for use in training and testing the neural networks. This is done (with all telescopes enabled) by moving the pistons, x tilt, and y tilt known deviations from the aligned position. Then the in-focus and out-of focus images are collected and used to form the power and sharpness (or alternate) metrics. The metrics may be generated from in-focus and out-of-focus images 35 and 40 according, for example, to the method of Gonsalves and further elaborated in the paper by Kendrick, Acton, and Duncan. The metrics may be the power metric, the sharpness metric, or any other convenient metric. In general, the metrics should produce an array of data based on an image of an object scene that is relatively independent of the objects in the scene. One or more metrics are generated for each object in the training set. Many of these samples will be used in the training of more than one of the neural networks. The samples collected are the samples which will be needed in the training steps 310–340. Depending on noise and uncertainty of actuator positions, it may be necessary to repeat samples so that the neural networks can train on an ensemble of samples and not be adversely affected by erroneously labeled samples. The generated metrics, along with the record of associated deviations from the aligned position, are stored for processing.

In step 310, a training set is selected for use in training and testing a particular neural network. The training set is different for each neural network and generally includes incremental steps for the parameter being estimated while the other parameters are held constant. For example, the training set may include setting N-2 telescopes to piston positions having zero offset relative to the reference telescope and setting the piston of the desired telescope to travel from −400 nm to +400 nm in 25 nm increments.

In step 315, the training set is supplemented to include "spoiler" positions. The spoilers are piston and/or tip/tilt settings at which the desired parameter assumes a known value, while each of the other parameters are moved "large" amounts (such as half wavelength displacements in piston or 2 microradians in tip or tilt). The purpose of the spoilers is to force the neural network to find a fit between features of the metrics and the desired piston without using features that are also correlated to motions of other pistons or tip/tilts. This procedure allows one to find features which are independent of most of the distortions of the other telescopes, and thus reduces the number of training examples necessary to train a particular NN to be sensitive to a particular piston position.

In step 320, each feature of one or more metrics is used as input to the neural network. Here we will use each element of one or more metrics such as the power metric and the sharpness metric as a "feature" of the metric. In a co-pending patent application we will add features based on Eigenvectors and Wavelets derived from the metrics. The output of the NN is an estimate of parameter position for the desired parameter. Each feature is an element of the power metric or sharpness metric. There is a different set of metrics for each parameter configuration within the training set.

Step 320 makes use of neural networks (NN) to find statistical relationships between the metrics and the distortions of the optical system in such a way that the NN can estimate changes of piston, tip, and tilt to correct for whatever distortions may exist at a particular instant. Many types of neural networks could be used for this purpose. However the preferred NN is the General Regression Neural Network (GRNN) described in the paper, "A general regression neural network," by D. F. Specht, IEEE Trans. Neural Networks, 2, 568–576 (1991) and the adaptive version of GRNN which is described in "Probabilistic Neural Networks and General Regression Neural Networks," by D. F. Specht in Fuzzy Logic and Neural Network Handbook, C. H. Chen, Ed., McGraw-Hill Book Co., New York, 1995.

The objective of step 320 is to find the best subset of elements with the best fit between the NN output and the known displacements for the training set. Many techniques are available to accomplish this. In fact the whole fields of neural networks, genetic algorithms, and statistical inference are dedicated to solving these types of problems. Here we will describe several approaches to solving this particular problem, but these cannot be exhaustive.

Approach 1 for step 320. In order to find the element of the metrics that provides the best data for estimating a parameter value, each element of the metric is used to configure a GRNN that outputs an estimate. The GRNN networks are then used with the element values as inputs and with the known position of the desired parameter used as a basis for comparison with the outputs of each GRNN. The element which produces the least error in this comparison is retained as the best element. In performing step 320, a large amount of data must be processed. For example, a metric with reasonably high resolution may include more than 16,000 elements (pixel locations). Therefore, 16,000 different neural networks may be configured in order to determine the element with the best fit. In order to reduce the complexity, certain properties of the metric may be exploited. For example, for metrics that are symmetric, only one half of the total number of elements may be used as candidate elements for purposes of step 320. In addition, it may be possible to reject other elements as candidates based on known characteristics of the metrics. For example, if certain parts of the metrics are known to not change substantially based on the relative phasing of the image, those parts and the elements within them may be rejected as candidate elements. Once the best element is identified, then the best element is retained as one of the inputs to the GRNN. Then every possible element is added as a potential second input to the neurons. After the best two inputs are identified, a third, fourth, etc. are added in turn until accuracy on a test set fails to increase. These steps may be repeated until a predetermined maximum is reached or until a predetermined minimum error is reached. In general, any number of elements may be identified and retained. However, in a preferred embodiment, between 1 and 20 elements are retained. Retaining fewer elements facilitates reducing the training time and also allows the use of elements that are the most correlated with piston position for the desired element.

Approach 2 for step 320. The same database could be used to train a multi-level perceptron neural network using back-propagation as described in Chapter 8 of Parallel Distributed Processing, Volume 1: Foundations, by David Rumelhart, James McClelland, and the PDP Research Group, MIT Press, Cambridge, Mass.,1987. In theory, inputs that are not decoupled from motions of parameters other than the parameter of interest are automatically given weights near zero and therefore no selection of best elements is required. While this is true for large training sets, we have found that GRNN works much better for limited data sets, particularly with regard to estimates of parameters close to zero (the goal of the system) being influenced by deviations of the other parameters.

Approach 3 for step 320. Adaptive GRNN as described in "Probabilistic Neural Networks and General Regression Neural Networks," by D. F. Specht in Fuzzy Logic and Neural Network Handbook, C. H. Chen, Ed., McGraw-Hill Book Co., New York, 1995. Each element multiplied by an adaptive weight is input to a GRNN network (this can also be described as a separate sigma for each input with adaptation of the sigmas). Gradient descent on error or gradient ascent on accuracy is used to adjust the weights. When weights have values close to zero, the corresponding input is removed and adaptation continues until the number of inputs is reduced to a predetermined number and accuracy levels off.

Approach 4 for step 320. Genetic Adaptive GRNN. Again, each element multiplied by an adaptive weight is input to a GRNN network. Then a genetic algorithm is used to pick weights, and accuracy is used as a "fitness" criterion. To limit the number of inputs in the final network to be used in real time, there are at least two possibilities. One is to accept the best n inputs as use only these for a second genetic adaptation of the GRNN weights. The other is to use the genetic algorithm to pick inputs as well as weights for those inputs. Commercial software packages are available for using and optimizing genetic algorithms. For example, software for Genetic Adaptive GRNN is NeuroShell II from Ward Systems Group, Frederick, Md., USA. A textbook on genetic algorithms is "Genetic Algorithms in Search, Optimization, and Machine Learning," Goldberg, D. E., Addison-Wesley (1989).

Approach 5 for step 320. Nearest-neighbor or K-nearest-neighbor classification. This is strictly matching of an unknown pattern to each of the patterns in the training set. As in the other approaches, the test set patterns cannot be contained in the training set. The brute force application of this technique of memorizing all possible patterns is doubly impractical because of the combinatorial explosion of many possible values of many parameters, and because the patterns would be defined as thousands of dimensions (one for every element in both metrics). Here again the concept of spoilers is key so that a limited number of inputs which are unaffected by parameters other than the one of interest are input to the nearest neighbor classifier. The inputs used for each trial could be selected by a genetic algorithm or other random selection technique.

In step 325, the steps 310–320 are repeated for other NNs corresponding to the remaining parameters of the imaging system (piston and tip/tilt estimations). In this manner, M NNs are defined and trained, each corresponding to a desired parameter of a particular telescope.

In step 330, it will be necessary to selectively reduce the number of "spoilers" in each training set. In step 315 it was naively assumed that by using "spoilers" it would be possible to find inputs sensitive to the parameter to be estimated and insensitive to the other parameters. This is largely true, but not completely. As an example, we have found that certain telescopes arranged on an axis of symmetry show prominent features along a corresponding symmetry direction in the metrics. Therefore if certain spoiler patterns are removed from the training and testing sets, accuracy of the neural network can be greatly improved. The penalty for removing spoilers is that the resulting NN is no longer independent of the parameter of the spoiler, and that the resulting NN has to be trained on every combination of two or three parameters instead of just one. This is a practical solution to a difficult combinatorial problem. For example, if the system has 24 parameters which each have 9 discrete positions, every possible combination of parameters would be almost 10 to the 23 power. However, by grouping the parameters in twos and threes, the number of training patterns required is only 972 (9×9×12 pairs) or 5832 (9×9× 9×8 triples). These numbers can be reduced even more by specifying less than 9 discrete positions per parameter for training. In step 335, the steps 310–330 are repeated to find the best groupings of parameters.

In step 340, the network is reduced in size for efficiency. While GRNN is ideal for the iterative steps 310 through 330 because of its inherent fast training ability, it may be cumbersome in operation because it requires a separate neural node for every training pattern. For this reason, it is desirable to prune out nodes which have little effect on the estimates prior to using GRNN in operation. Typically a large reduction of nodes is possible because the training data is redundant. Nearest neighbor networks may be pruned for the same reasons.

In step 345, the M trained neural networks are saved. The trained neural networks may be used to control parameters, such as the piston position for N−1 telescopes relative to a reference telescope and/or the 2(N−1) tilt positions relative to the reference telescope of an optical imaging system 10.

Figure 4:
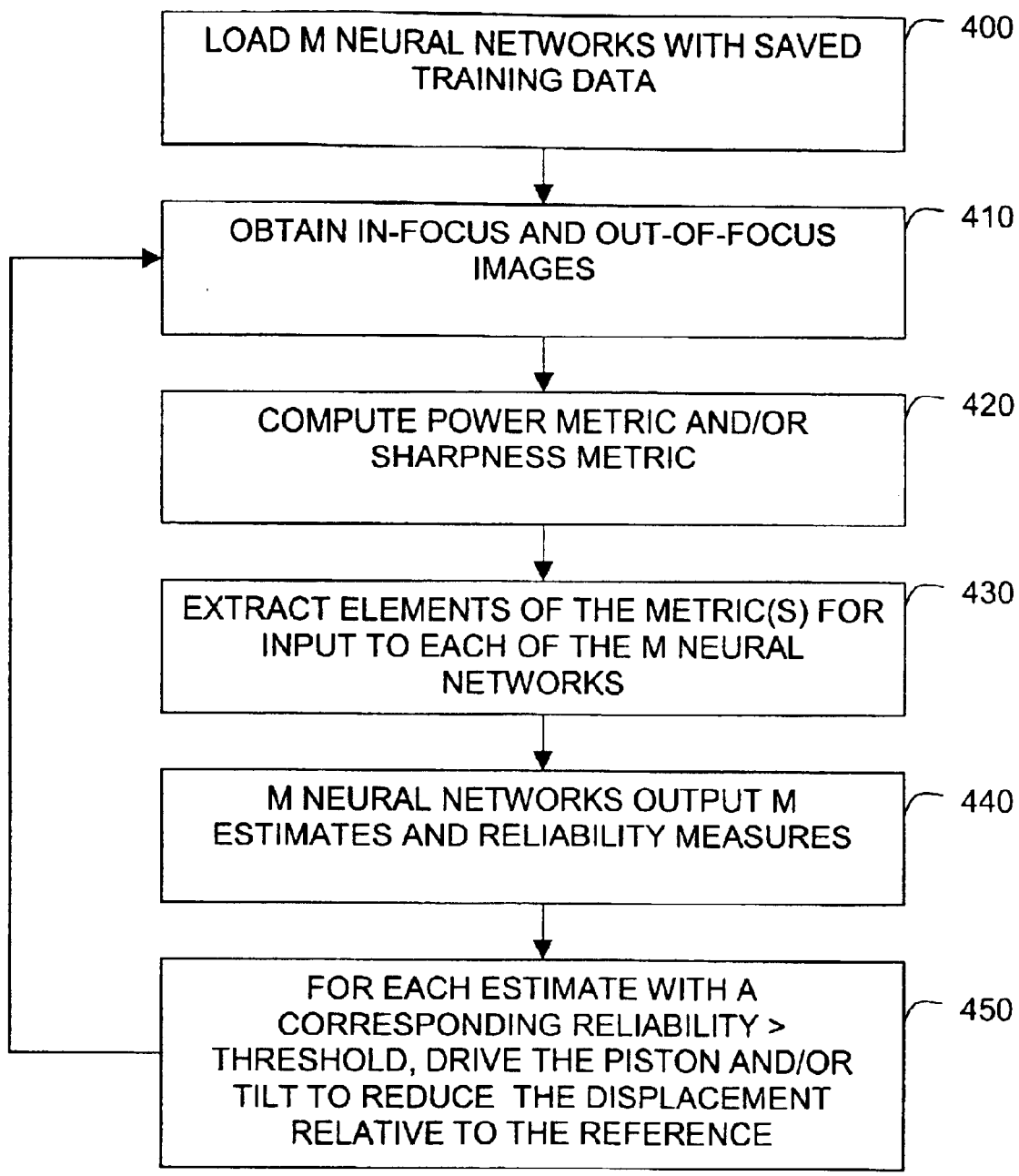
FIG. 4 depicts a method of controlling an optical system according to an embodiment of the present invention.

FIG. 4 depicts a method of controlling N−1 telescopes relative to a reference telescope within an optical imaging system 10. Referring to FIG. 4, in step 400, all the neural networks are loaded with the saved training data. Each NN is configured to have inputs receive the elements that have been identified during training for that NN. The NN in turn outputs an estimate of the piston position based on the inputs.

As an example, six elements may be used as inputs to each GRNN network for an optical system with nine telescopes. The six elements may be different for each GRNN and are those six identified according to the training procedures described with reference to FIG. 3. This is an example only, however, and any convenient number of elements may be used.

In step 410, the optical imaging system 10 is trained on a field of view of interest. The phase diversity sensor 30 receives the input from the telescopes and generates an in-focus image 35 and an out-of-focus image 40 in a well known manner. The in-focus image 35 and out-of-focus image 40 each include a plurality of pixels.

In step 420, the image processor 50 receives the in-focus image 35 and the out-of-focus image 40 and determines one or more metrics based on the images 35 and 40. The metrics may be any convenient metric that is largely independent of the object scene.

In step 430, image processor 50 extracts for each neural network the features (elements in the simplest case) that are the inputs to each of M neural networks. The elements are provided as inputs to each NN.

In step 440, the M neural networks output M estimates of piston position, tip and tilt, and optionally reliability measures. Each output estimate may be a value representing the position of the piston, a value that represents the offset of the piston relative to a reference or the reference piston, or a value proportional to the difference or sum of any piston positions. The final correction for a particular piston may be the output of a single neural network, or it may be an arithmetic combination of more than one neural network output.

The reliability measure may-be a value based on the value of the normalization performed by the GRNN. In other words, when many pattern neurons contribute significantly to the output in response to an input, the normalization value will be correspondingly high and will tend to indicate that the output estimate is more reliable. Accordingly, the normalization factor may be used as a measure of reliability of the estimate. Alternatively, the (Euclidean or other) distance to the nearest training example can be used as a measure of reliability.

Then in step 450, each piston control unit 65 determines whether the reliability estimate output from the NN 60 meets a predetermined criteria. The criteria may be that the reliability estimate is above or below a certain value. This step is used as a filter to throw away the piston position estimate when the estimate is unreliable. In step 450, for each NN having a reliable estimate, the piston estimate is used to drive the piston to a new position. The amount that the position is driven may be adjusted to be proportional to the amount of offset necessary to correct the piston error based on control principles. The proportional amount may be determined to overdampen, underdampen or critically dampen the adjustments. In general, the piston position estimate represents an offset error from the reference telescope and in step 450, the estimate is used to drive the piston back to its proper alignment with the reference telescope.

While certain embodiments have been described herein, it will be understood by those having ordinary skill in the art that changes may be made to those embodiments without departing from the spirit and scope of the invention.

What is claimed is:

1. A method of training neural networks to perform phase diversity wavefront correction of N telescopes within an optical system, comprising:
    loading a plurality of neural networks with training data representing configurations of the N telescopes;
    forming in-focus and out-of-focus composite images from the N telescopes, the telescopes being configured according to the training data;
    generating at least one metric from the images for each configuration of the telescopes;
    providing elements from the at least one metric as inputs to the neural networks;
    determining a set of elements for each neural network and using a training algorithm to adjust internal parameters of the network to minimize differences between network outputs and the known training data; and
    saving the elements of the trained neural networks for later use in estimating system parameters.

2. The method according to claim 1, wherein the determining step comprises:
    finding a best one of the elements for the set;
    incorporating the best element of the set into the neural network; and
    saving information identifying the best element for each neural network.

3. The method according to claim 2, wherein determining further comprises:
    repeating the finding, incorporating and saving steps to determine more than one best element for the set for each of the neural networks.

4. The method according to claim 3, wherein the determining further comprises:
    repeating the finding, incorporating and saving steps a predetermined number of times to find n best elements for the set for each of the neural networks.

5. The method according to claim 3, wherein the determining further comprises:
    repeating the finding, incorporating and saving steps until a predetermined error is met.

6. The method according to claim 1, wherein the training data includes "spoilers".

7. The method according to claim 1, wherein the training data includes a plurality of piston positions for a desired piston.

8. The method according to claim 1, wherein the training data includes a plurality of tilt positions for a desired tilt correction.

9. The method according to claim 1, further comprising saving the trained neural networks with information identifying at least one best element for each neural network.

10. The method according to claim 1, further comprising repeating the method for each piston, x tilt, and y tilt controller associated with each telescope.

11. The method according to claim 1, wherein the neural network is a general regression neural network.

12. The method according to claim 1, wherein the neural network is a multi-layer perceptron neural network.

13. The method according to claim 1, wherein the neural network is a probabilistic neural network.

14. The method according to claim 1, wherein the neural network is a nearest neighbor or K-nearest-neighbor network.

15. The method according to claim 1, wherein the determining step comprises:
    selecting the set of elements based on a genetic algorithm.

16. The method according to claim 15, wherein the selecting step includes identifying candidate elements based on the genetic algorithm and selecting candidate elements as the elements of the set based on the output of the neural networks for the known test data.

17. The method according to claim 1, wherein the determining step comprises:
    identifying candidate elements
    weighting candidate elements based on gradient descent; and
    testing candidates of weighted elements based on the output of the neural networks for the known test data; and
    selecting weighted elements for the set of elements based on the testing.

18. The method according to claim 1, wherein the determining step comprises:
    selecting the set of elements based on a multi-dimensional optimum search technique.

19. A system for training neural networks to perform phase diversity wavefront correction of N telescopes, comprising:
    N telescopes each having a piston controlled mirror and being characterized by training data;
    a phase diversity sensor collecting images from the N telescopes and producing an in focus image and an out of focus image from the telescope images;
    an image processor generating at least one metric from the in focus and out of focus images for each configuration of the telescopes, each metric including an array of elements representing the metrics; and
    M neural networks coupled to the image processor, each neural network being configured with training data representing configurations of the N telescopes and determining a set of elements for each neural network based on the output of each neural network and the known training data.

20. The system according to claim 19, wherein:
    the image processor finds a best one of the elements for the set, incorporates the best element of the set into the neural network and saves information identifying the best element for each neural network.

21. The system according to claim 19, wherein:
    the image processor repeatedly finds more than one best element, incorporates the best element into the neural network and saves the information identifying each best element for each neural network.

22. The system according to claim 19, wherein:
    the image processor repeatedly finds n best elements incorporates the n best elements into the neural network and saves the information identifying the n best elements for each neural network. into the set, where n is a predetermined number.

23. The system according to claim 19, wherein:
the image processor repeatedly finds more than one best element, incorporates the best element into the neural network and saves the information identifying each best element for each neural network until a predetermined error threshold is met.

24. The system according to claim 19, wherein the training data includes spoilers.

25. The system according to claim 19, wherein the training data includes a plurality of piston positions for a desired piston.

26. The system according to claim 19, wherein each neural network saves information identifying at least one best element for each neural network.

27. The system according to claim 19, further comprising:
a piston, x tilt and y tilt controller associated with each telescope; and
a neural network associated with each piston, x tilt and y tilt controller.

28. The system according to claim 19, wherein the neural networks include a general regression neural network.

29. The system according to claim 19, wherein the neural networks include a multi-layer perceptron neural network.

30. The system according to claim 19, wherein the neural networks include a probabilistic neural network.

31. The system according to claim 19, wherein the neural networks include a nearest neighbor neural network.

32. The system according to claim 19, wherein the image processor selects the set based on a genetic algorithm.

33. The system according to claim 32, wherein the image processor selects candidate elements based on the genetic algorithm and selects candidate elements as the elements of the set based on optimizing the outputs of the neural networks for the known test data.

34. The method according to claim 19, wherein the image processor:
identifies candidate elements;
adds weights to the candidate elements based on gradient descent;
tests the weighted candidate elements based on the output of the neural networks for the known test data; and
selects the weighted elements for the set of elements based on the testing.

35. The system according to claim 19, wherein the image processor:
selects the set of elements based on a multi-dimensional optimum search technique.

36. A method for phase diversity wavefront correction of N telescopes positioned within an aperture for sparse sampling within the aperture, comprising:
forming in-focus and out-of-focus composite images from the N telescopes;
generating at least one metric from the images;
providing selected elements from the at least one metric as inputs to the trained neural networks;
outputting a signal from each of the trained neural networks corresponding to an amount of correction required for each parameter to be controlled for each telescope.

37. The method according to claim 36, further comprising:
comparing a reliability measure from each neural network with a pre-determined criteria; and
when the reliability measure meets the criteria at least one of the neural networks, drives a controller for piston or tip/tilt correction of at least one of the telescopes.

38. The method according to claim 36, wherein the neural networks include a general regression neural network.

39. The method according to claim 36, wherein the neural networks include a multi-layer perceptron neural network.

40. The method according to claim 36, wherein the neural networks include a probabilistic neural network.

41. The method according to claim 36, wherein the neural networks include a nearest neighbor or K-nearest neighbor network.

42. The method according to claim 36, wherein the N mirrors are each associated with a respective one of N telescopes.

* * * * *